United States Patent [19]
Gearin et al.

[11] Patent Number: 5,505,581
[45] Date of Patent: Apr. 9, 1996

[54] LOADING AND UNLOADING SYSTEM FOR MOTOR VEHICLE TRANSPORTER

[75] Inventors: Peter Gearin; David J. Miller, both of Portland, Oreg.

[73] Assignee: G & G Intellectual Properties, Inc., Lake Oswego, Oreg.

[21] Appl. No.: 312,401

[22] Filed: Sep. 26, 1994

Related U.S. Application Data

[62] Division of Ser. No. 155,021, Nov. 19, 1993, Pat. No. 5,454,686.

[51] Int. Cl.⁶ .................................................. B60P 3/08
[52] U.S. Cl. ........................... 414/498; 414/537; 410/26; 410/9; 410/29
[58] Field of Search .................................. 414/498, 499, 414/500, 786, 522, 537, 538, 501, 539, 540, 390, 391, 469, 527, 392, 528, 529; 410/30, 26, 29, 24, 19, 18, 3, 4, 6, 7, 8, 13, 14, 15, 16, 29.1, 17, 66, 67; 220/1.5

[56] References Cited

U.S. PATENT DOCUMENTS

| | | |
|---|---|---|
| 3,308,845 | 3/1967 | Bellas et al. . |
| 3,498,480 | 3/1970 | Gutridge . |
| 3,667,635 | 6/1972 | Hackney . |
| 3,675,795 | 7/1972 | Dluhy . |
| 3,709,155 | 1/1973 | Pringle . |
| 3,710,961 | 1/1973 | Bomstein . |
| 3,931,895 | 1/1976 | Grimaldo . |
| 4,455,119 | 6/1984 | Smith . |
| 4,668,142 | 5/1987 | Fity et al. . |
| 4,759,668 | 7/1988 | Larsen et al. . |
| 4,768,916 | 9/1988 | Gearin et al. . |
| 4,786,222 | 11/1988 | Blodgett . |
| 4,919,582 | 4/1990 | Bates et al. . |
| 4,957,407 | 9/1990 | Gearin . |
| 5,009,560 | 4/1991 | Ruder et al. ............................ 414/392 |
| 5,040,935 | 8/1991 | Gearin et al. . |
| 5,215,424 | 6/1993 | Gearin et al. . |
| 5,286,149 | 2/1994 | Seay et al. . |
| 5,297,908 | 3/1994 | Knott . |

FOREIGN PATENT DOCUMENTS

| | | |
|---|---|---|
| 961699 | 1/1975 | Canada . |
| 78924 | 5/1983 | Japan . |
| 2183620 | 6/1987 | United Kingdom . |

*Primary Examiner*—Frank E. Werner
*Attorney, Agent, or Firm*—Chernoff, Vilhauer, McClung & Stenzel

[57] ABSTRACT

A system for loading motor vehicles onto, and unloading motor vehicles from, a transporting vehicle enables motor vehicles to be supported one above the other on a frame, after which the frame with its supported motor vehicles is moved as a unit onto a transporting vehicle at a loading location. After transport of the frame and its motor vehicles from the loading location to a destination, the motor vehicles are unloaded from the transporting vehicle not as a unit but rather individually while the frame remains on the transporting vehicle.

20 Claims, 14 Drawing Sheets

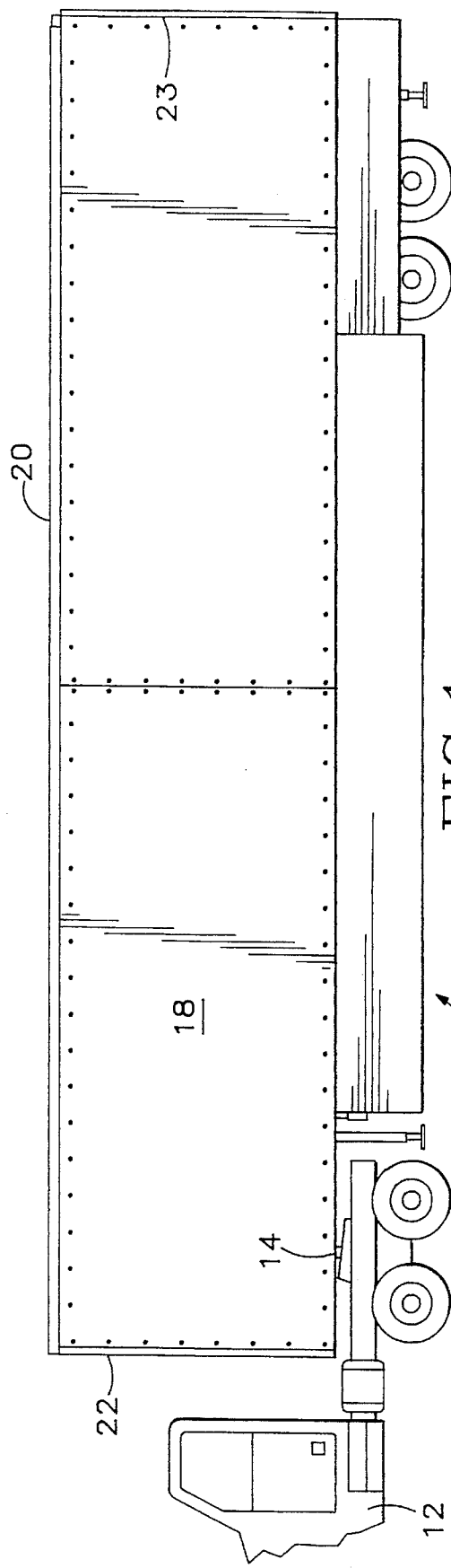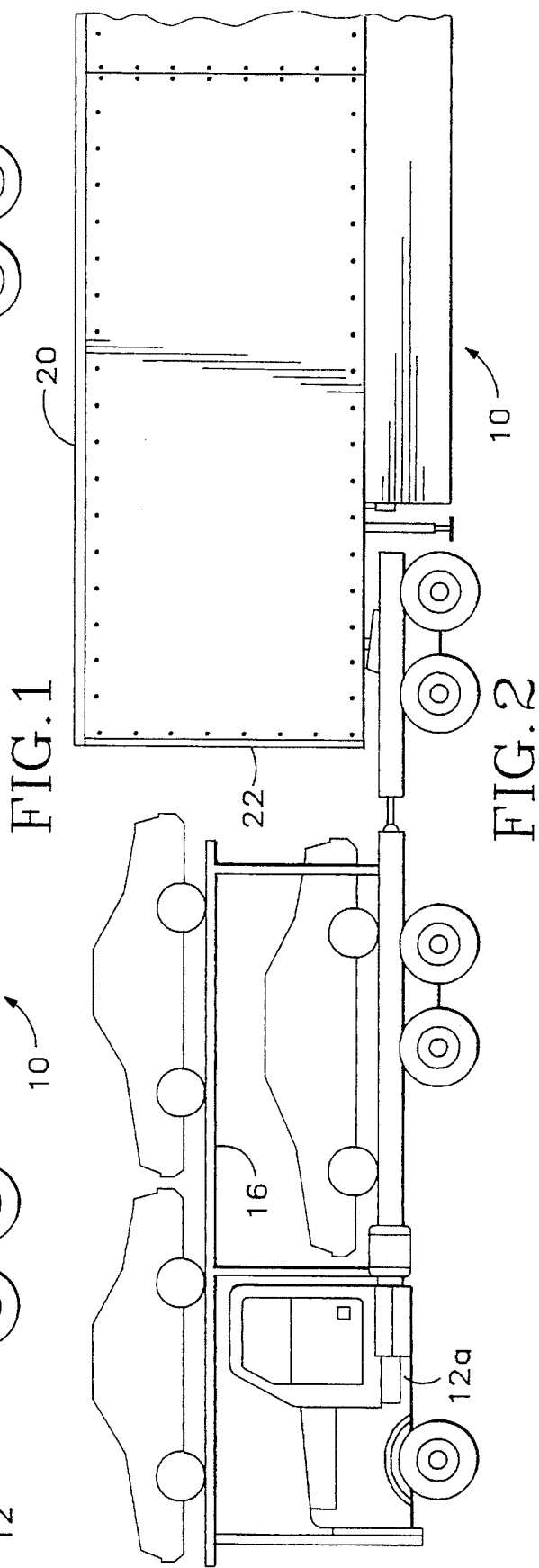

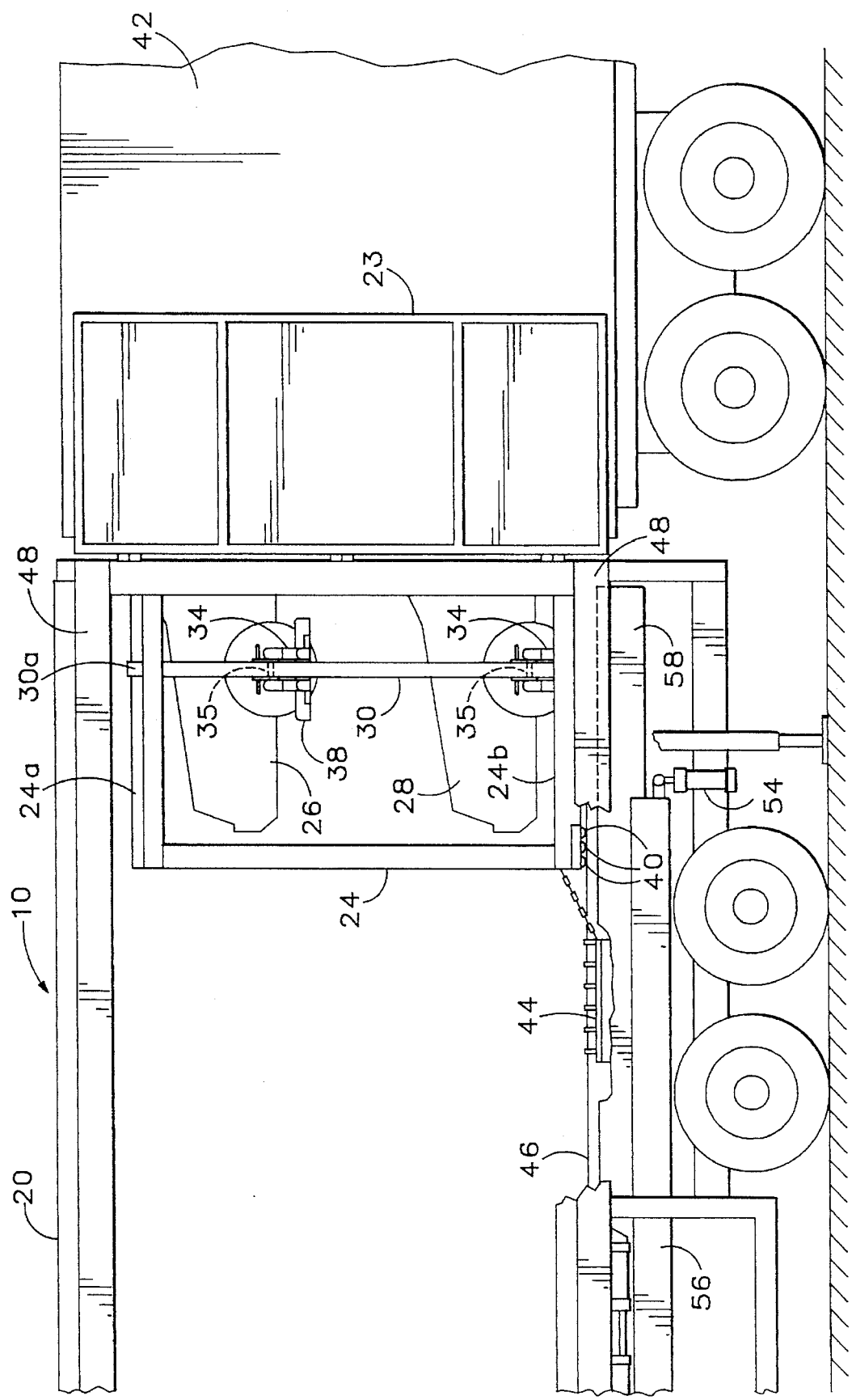

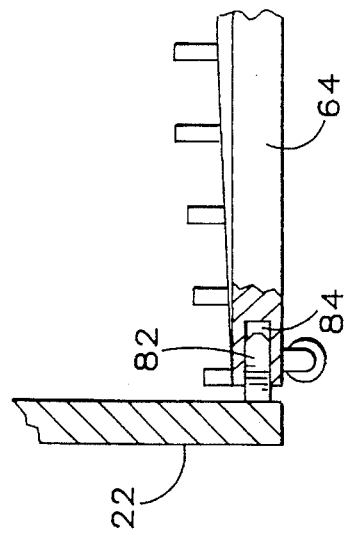
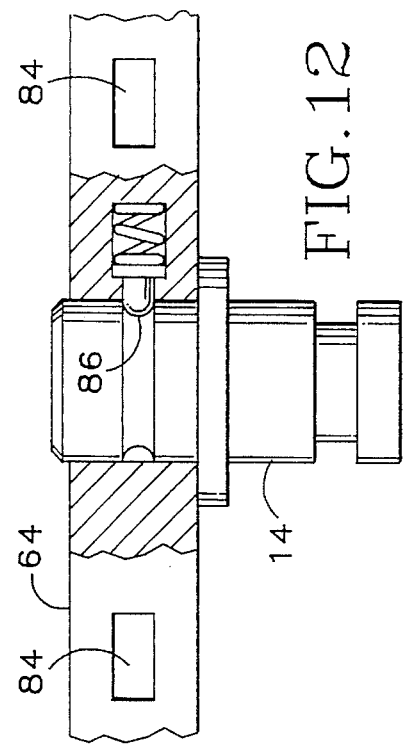
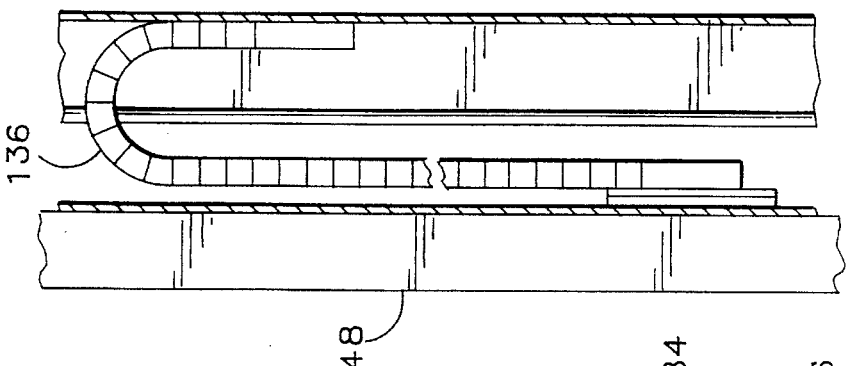
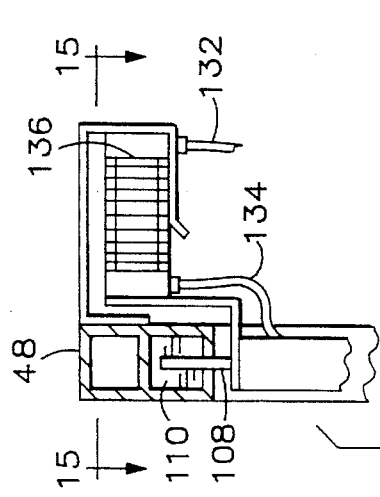
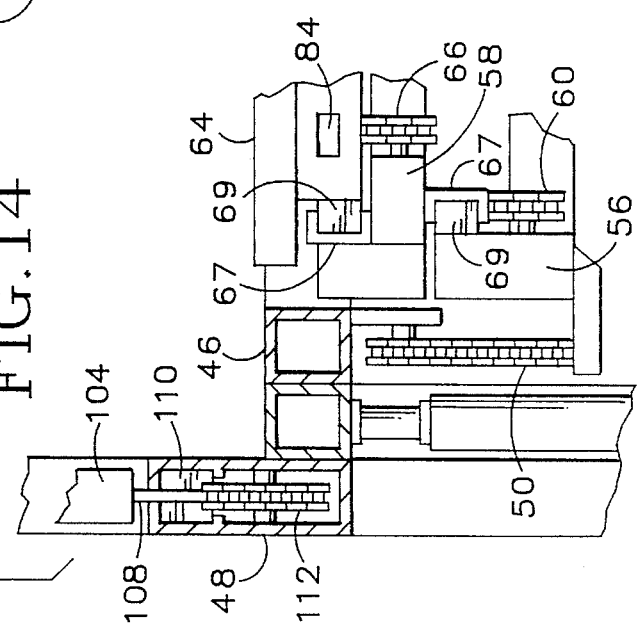

5,505,581

LOADING AND UNLOADING SYSTEM FOR MOTOR VEHICLE TRANSPORTER

This is a divisional of application(s) Ser. No. 08/155,021 filed on Nov. 19, 1993 now U.S. Pat. No. 5,454,686.

BACKGROUND OF THE INVENTION

This invention relates to the transporting of motor vehicles and, more particularly, to the loading of motor vehicles onto, and the unloading of motor vehicles from, a transporting vehicle which carries the motor vehicles from a loading location to a destination.

In U.S. Pat. No. 4,957,407, which is incorporated by reference herein, a system is shown for loading and unloading motor vehicles into and out of standard cargo-carrying containers or other enclosures which are then transported from the loading location to a destination where they are unloaded. The loading process is accomplished by using high-volume loading equipment to load the vehicles one at a time onto a frame, which supports the vehicles in respective upper and lower positions one above the other, while the frame is exterior of the enclosure. Once the frame has been loaded, it is inserted together with its supported vehicles as a unit into the enclosure for transport. The unloading process is the reverse of the loading process, that is, the frame with its supported vehicles is removed as a unit from the enclosure and then the vehicles are unloaded one at a time from the frame. The benefit of this system over previous comparable systems, such as that shown in U.S. Pat. No. 4,768,916 which is also incorporated by reference herein, is that at no time must a motor vehicle be driven into or out of the frame or into or out of any enclosure, thereby preventing damage to the vehicle which could otherwise occur by opening the door in a confined space to permit the driver to get out of the vehicle. The system shown in the aforementioned U.S. Pat. No. 4,957,407 is a less expensive alternative to a related system shown in U.S. Pat. No. 4,919,582 which also avoids the necessity for driving the vehicles into or out of the frame or an enclosure.

The system shown in U.S. Pat. No. 4,957,407 has one possible drawback in that equipment similar to that required to load the motor vehicles onto the frame and into the enclosure at the loading location must also be provided to unload the vehicles at their destination. Where the destination point is not a high-volume freight terminal but rather a vehicle dealer, it is not economically feasible to provide the described high-volume unloading equipment. Accordingly, using the system of the '407 patent, it has heretofore been necessary to transport the motor vehicles over the last leg of their journey, i.e. from a freight terminal to an individual dealer's location, by conventional vehicle transporters which expose the motor vehicles to hazards that the described system prevents during the other legs of their journey.

Accordingly, what is needed is a dealer-delivery system for loading, transporting and unloading motor vehicles which prevents the same hazards that are prevented by the system shown in U.S. Pat. No. 4,957,407, which interfaces compatibly with such system, but which does not require the presence of such system's loading equipment at the dealer destination.

SUMMARY OF THE INVENTION

The present invention satisfies the foregoing need by providing a system enabling motor vehicles supported in upper and lower positions on a supporting frame to be loaded as a unit onto a transporting vehicle as in the aforementioned U.S. Pat. No. 4,957,407, but also enabling the same motor vehicles to be unloaded, while the supporting frame remains on the transporting vehicle, in a manner different from the loading procedure.

Preferably, the transporting vehicle has an elongate enclosure into which the supporting frame with its supported vehicles is inserted matingly as a unit during the loading process, and also has a motor vehicle transferring assembly operable within the enclosure for transferring the motor vehicles from their respective upper and lower positions on the frame to other positions supported upon a portion of the transporting vehicle, independently of the frame, for unloading purposes.

Preferably, the portion of the transporting vehicle to which the motor vehicles are transferred from the frame is tiltable downwardly longitudinally of the transporting vehicle, and is capable of longitudinally moving the motor vehicles along such portion, to facilitate the unloading of the motor vehicles.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a partial side view of an exemplary transporting vehicle for use in the present invention.

FIG. 2 is a partial side view of an alternative embodiment of a transporting vehicle for use in the present invention.

FIG. 3 is a simplified enlarged partial side view showing the loading of the transporting vehicle of FIG. 1 with its side-curtains and a portion of its other structure removed.

FIG. 12 is an enlarged, partially sectional detail view of the trailer hitch pin assembly of the transporting vehicle FIG. 1.

FIG. 13 is an enlarged sectional view taken along line 13—13 of FIG. 5.

FIG. 14 is an enlarged detail view of a portion of FIG. 6.

FIG. 15 is a partially sectional view taken along line 15—15 of FIG. 14.

DETAILED DESCRIPTION OF THE PREFERRED EMBODIMENT

Figure 4A:
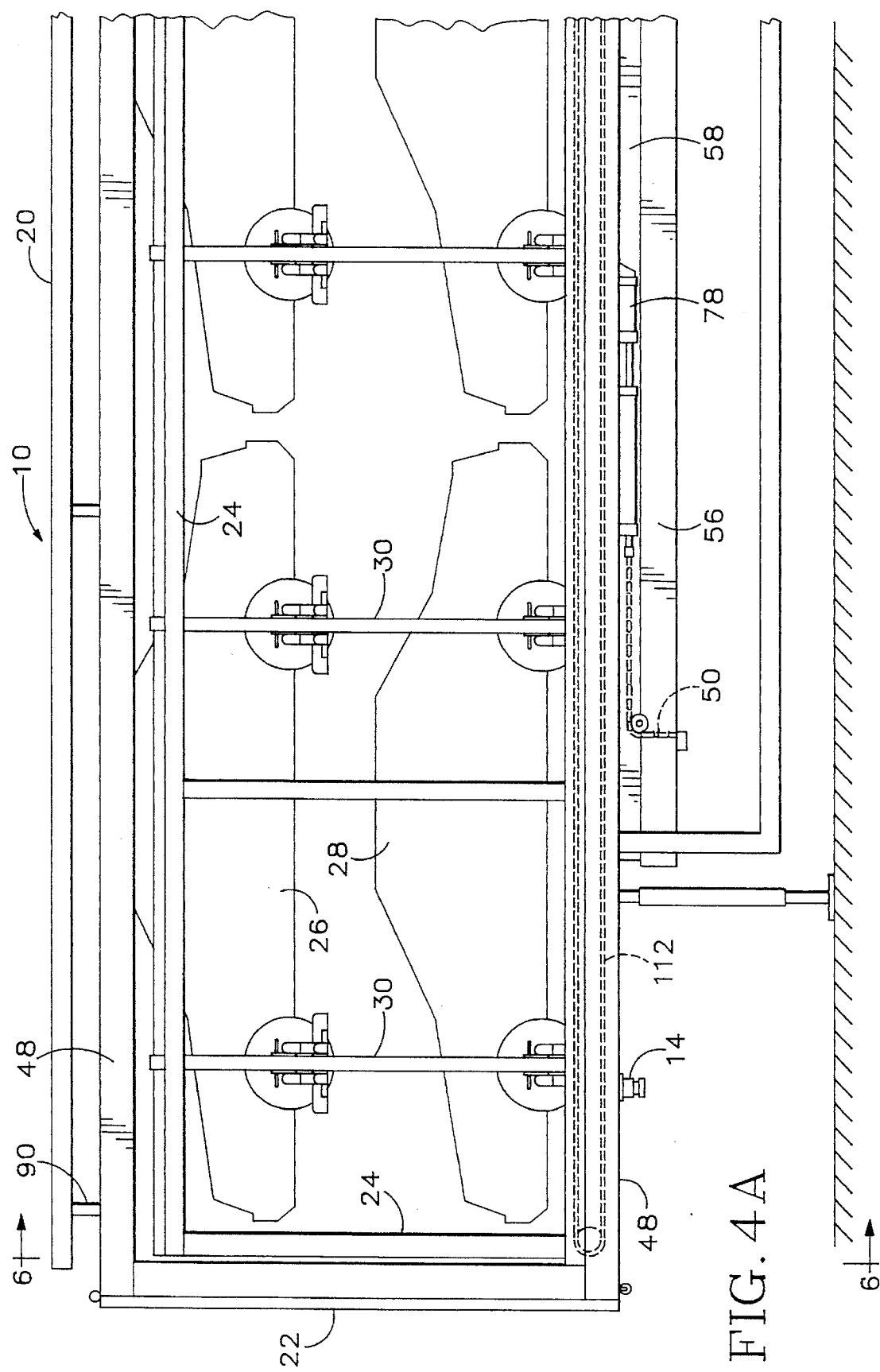
FIGS. 4A and 4B are simplified enlarged side views of the transporting vehicle of FIG. 1 in a condition preparatory to unloading of the vehicles, with its side-curtains and a portion of its other structure removed.

An exemplary transporting vehicle in accordance with the present invention comprises a trailer 10 pulled by a conventional tractor 12 through a hitch pin 14. The alternative embodiment of FIG. 2 includes the same trailer 10 pulled by a modified tractor 12a having a conventional automobile-supporting rack 16 for increasing the number of motor vehicles which can be carried by the trailer/tractor combination. The trailer 10 comprises an elongate enclosure having side-curtains 18, a top 20 and openable doors 22, 23 on each end of the enclosure. The side-curtains 18 are preferably of waterproof fabric and easily removable to enable access to the interior during the loading and unloading procedures to be described hereafter.

The loading procedure shown in FIG. 3 is similar to that shown in the aforementioned U.S. Pat. No. 4,957,407. An elongate frame or sleeve 24 is loaded with a plurality of motor vehicles such as 26, 28 supported in vertically-spaced upper and lower positions, respectively, on vertical members such as 30. The members 30 may be suspended from the frame's upper rails 24a by slidable hooks 30a which permit adjustment of the members longitudinally along the rails 24a to match the wheel bases of the vehicles 26, 28. The frame's upper rails 24a may have longitudinally spaced slots (not shown) or apertures into which mating lugs or pins can be inserted to lock the hooks 30a in their desired longitudinal positions. Rather than being suspended from the frame's upper rails, the members 30 may alternatively rest supportably on the lower rails 24b, which may likewise have longitudinally spaced slots or apertures into which mating lugs or pins can be inserted to lock the members 30 in their desired positions. Wheel cradles 32 and cradle hangers 34 are vertically movable on the members 30 and lockable by pins 35 to spaced apertures in the members at variable heights as shown in the aforementioned U.S. Pat. No. 4,957,407. Each wheel cradle 32 has end plates 36 (FIG. 6) which rest detachably inside U-shaped shelf members 38 carried by the respective hangers 34. The frame 24, with the motor vehicles 26 and 28 supported at respective upper and lower positions, is inserted longitudinally as a unit matingly into the enclosure of the trailer 10, rolling on rollers such as 40. The frame 24 can either be pushed into the trailer enclosure by a power mechanism on the structure 42 from which it is inserted or, alternatively, can be pulled into the enclosure by a rear portion 44 of a sled to be described hereafter which is mounted on the trailer 10. The rollers 40 rest on respective rectangular beams 46 as shown in FIG. 6 which extend longitudinally along the interior of the trailer sides, and which form part of the trailer frame 48.

Figure 4B:
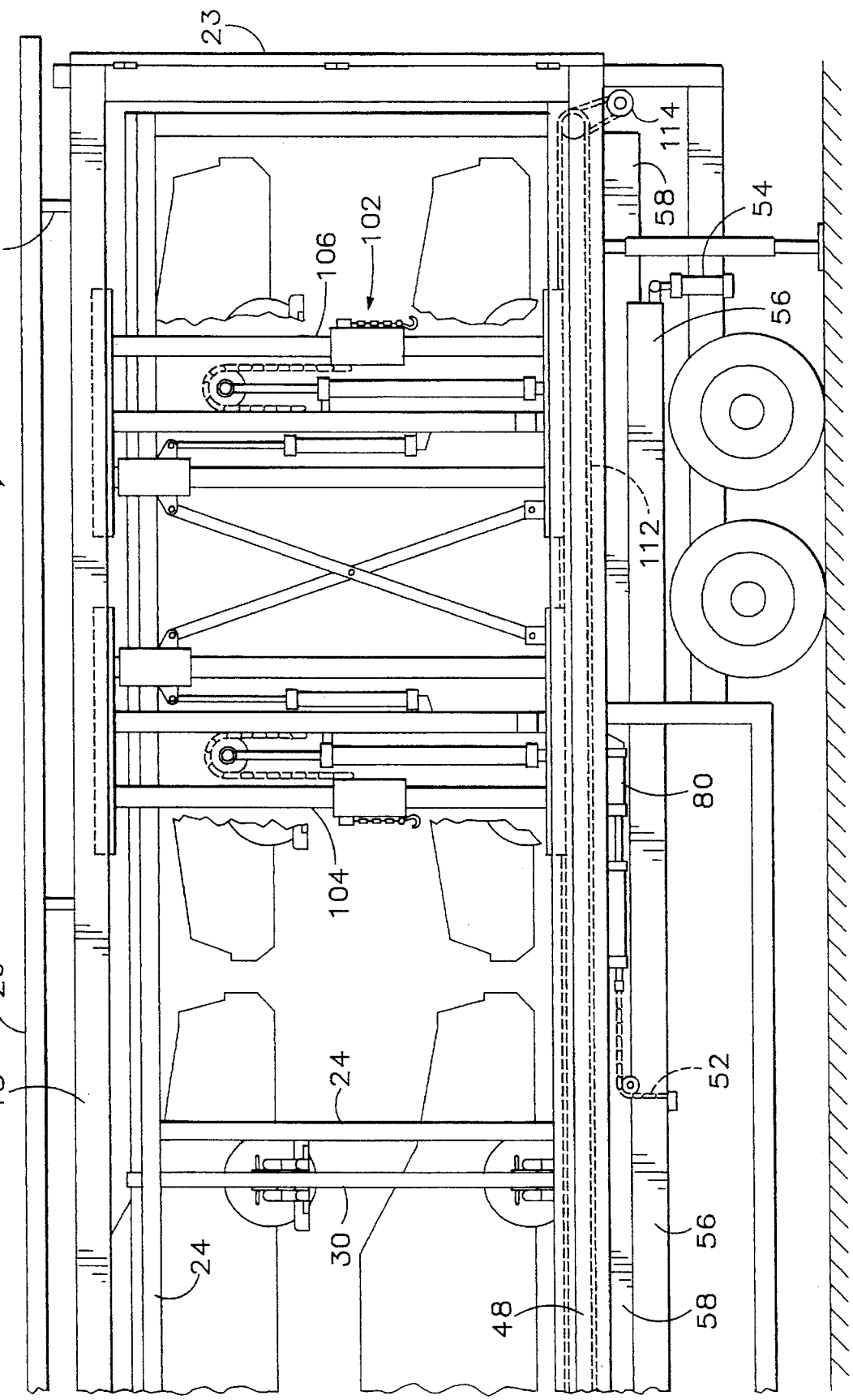
Figure 6:
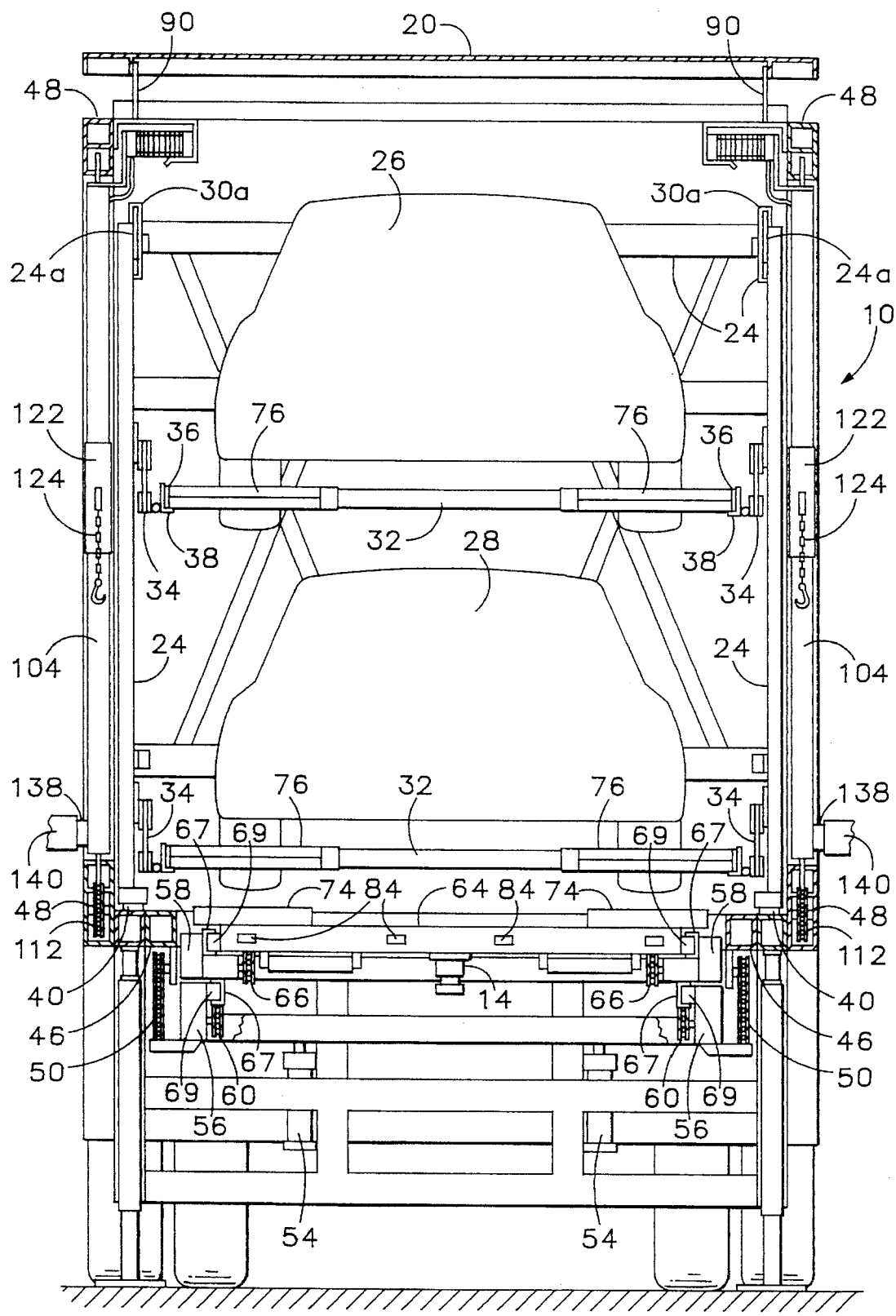
FIG. 6 is a simplified sectional view of the transporting vehicle taken along line 6—6 of FIG. 4A.
Figure 7A:
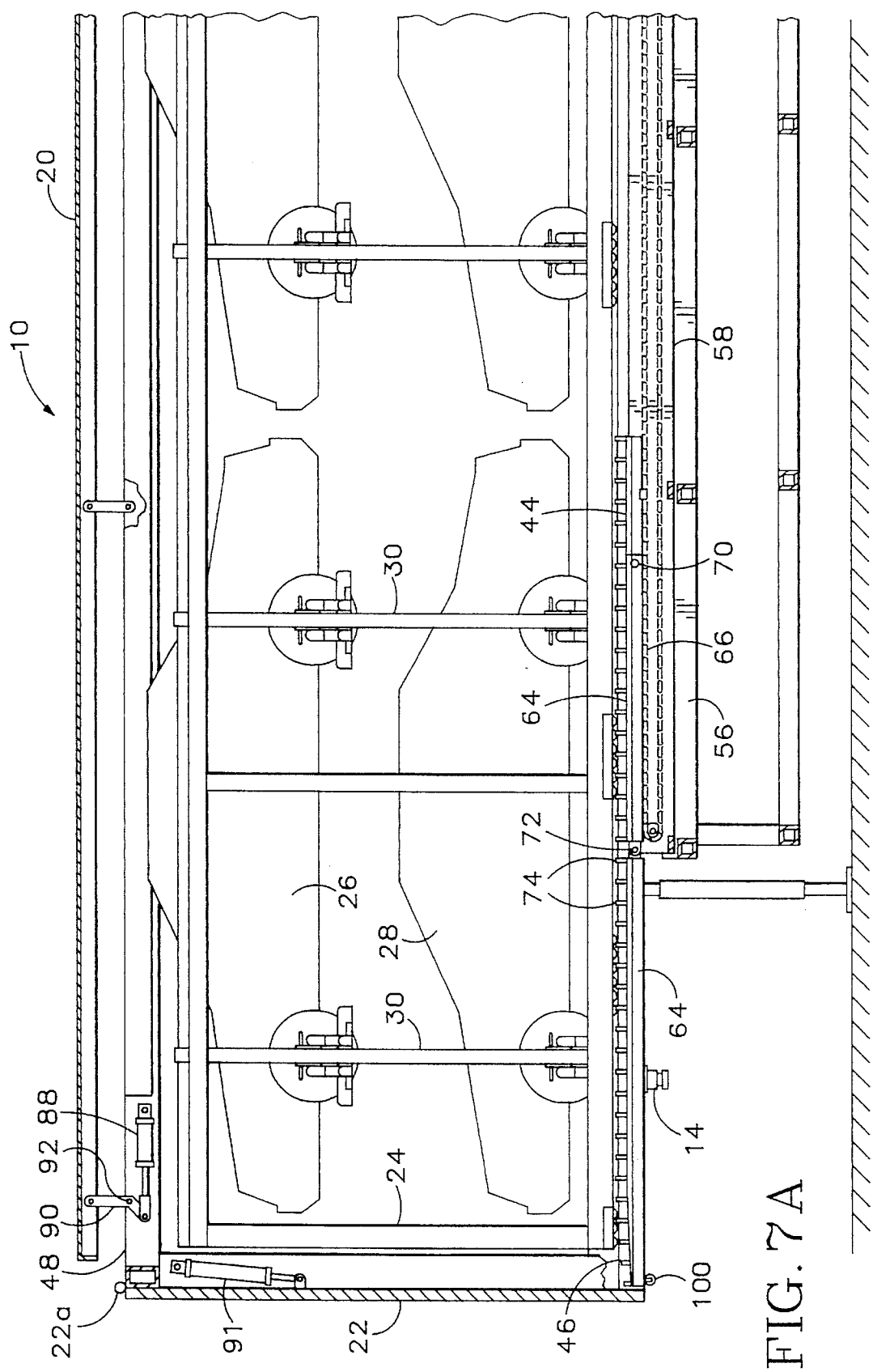
FIGS. 7A and 7B are further simplified enlarged side views of the transporting vehicle of FIG. 1 with further components removed to show underlying structure.
Figure 7B:
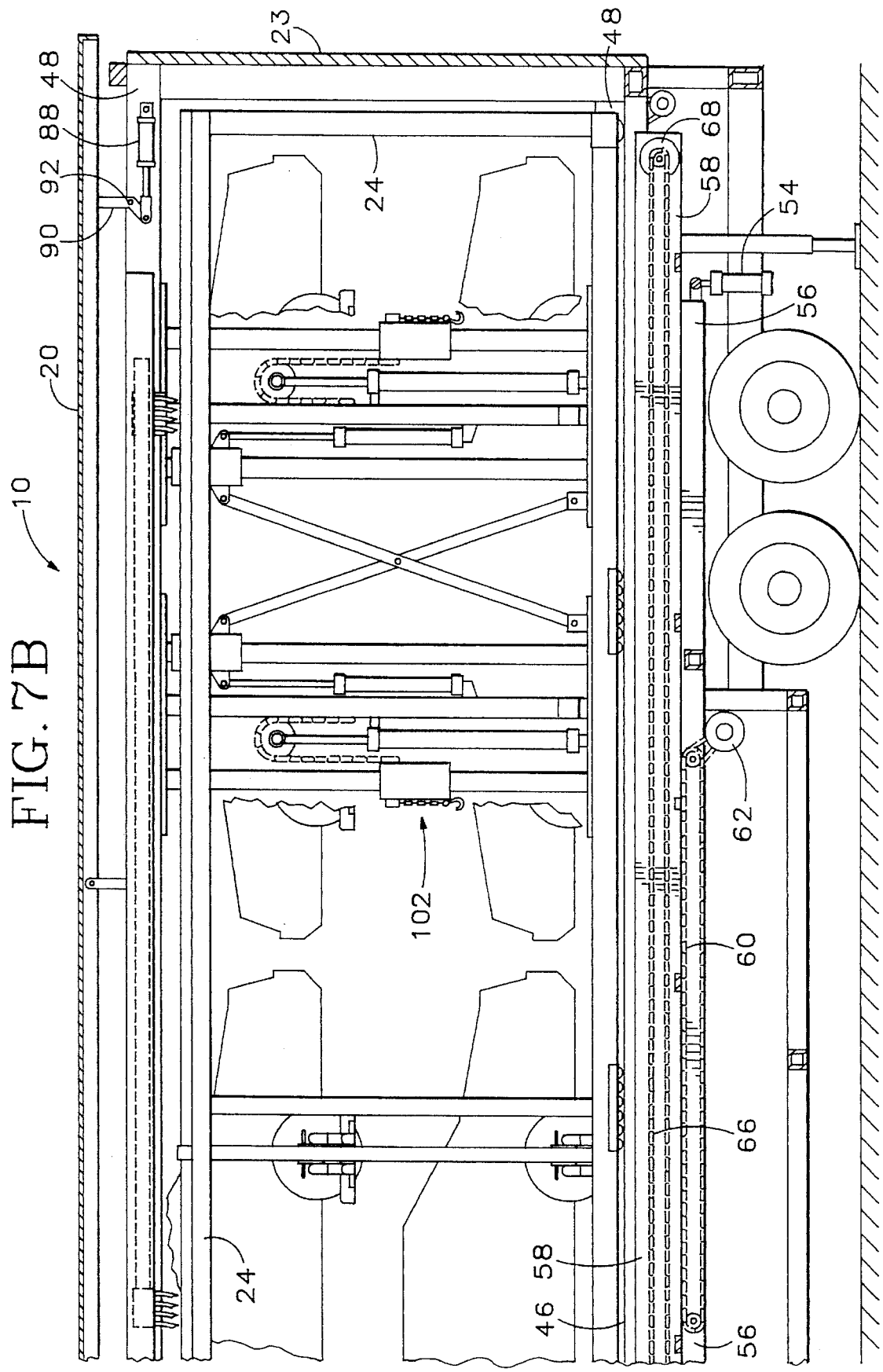

Located transversely between the rectangular beams 46 is a selectively liftable and lowerable sled assembly supported by the trailer frame 48 through chains 50, 52 and hydraulic cylinders 54 on each side of the trailer as shown in FIGS. 4A, 4B and 6. The chains 50 and 52 and cylinder 54 vertically support a longitudinally-extending primary guide 56 on each side of the trailer, upon which is mounted a secondary guide 58 which slides longitudinally with respect to the primary guide 56 under the control of a respective endless chain 60 on each side of the trailer driven by a motor 62 (see FIG. 7B). Mounted on the secondary guides 58 is a sled 64 selectively slidable along the secondary guides 58 by respective endless chains 66 on each side of the trailer driven by a motor 68 as shown in FIGS. 7A and 7B. The aforementioned respective sliding interconnections are composed of respective slide channels 67 interacting with mating longitudinal slide bushings 69 as shown in FIGS. 6 and 14. The chains 66 are connected to the rear portion 44 of the sled 64, which is normally attached to the remainder of the sled by pins such as 70. However, when the pins 70 are disconnected, the rear portion 44 of the sled can be moved rearwardly along the secondary guide 58 independently of the remainder of the sled to pull the frame 24 into the trailer enclosure as mentioned previously. In such case the portion 44 would engage the front of the frame 24 as shown in FIG. 3 to pull the frame partially into the enclosure, and would then be disengaged and reengaged with a mid-portion of the frame 24 to complete the pulling process. The sled 64 is articulated at a hinge 72 and includes longitudinally-spaced, transversely-extending vertical plates 74 which are spaced apart so that chocks 76 (FIG. 6) of each wheel cradle may rest interstitially between the plates 74.

FIGS. 4A–4B and 7A–7B show the trailer 10 in a condition preparatory to unloading, after the tractor 12 has been unhitched from the trailer. In this condition each of the primary guides 56 is in a lowered condition due to the extension of hydraulic cylinders 78 and 80 and the retraction of cylinder 54 on each side of the trailer. The secondary guides 58 are held in a rearwardly-retracted traveling position by the chains 60 and motor 62 to prevent the secondary guides 58 from contacting the tractor 12. The hitch pin 14 is detachably attached to the bottom of the sled 64 by a detent 86 as shown in FIG. 12, and the front of the sled 64 is fastened to the bottom of the forward door 22 as shown in FIG. 13 by the mating insertion of rectangular pins 82 at the bottom of the door 22 into rectangular sockets 84 in the sled 64. The pin and socket connections 82, 84, together with the sliding interconnection of the sled 64 with the secondary guides 58, provides adequate vertical support for the hitch pin 14, whose detachability from the sled permits the sled to be used for unloading the motor vehicles in a manner to be described hereafter. Also preparatory to unloading, the side-curtains 18 of the trailer are removed to permit access to the frame 24, and the trailer top 20 is preferably raised to enable lifting of the upper vehicles, such as 26, during the unloading process for reasons to be described hereafter. As best shown in FIGS. 7A and 7B, the top 20 is raised by extending hydraulic cylinders 88 which pivot levers 90 clockwise about their pivot points 92.

Figure 8:
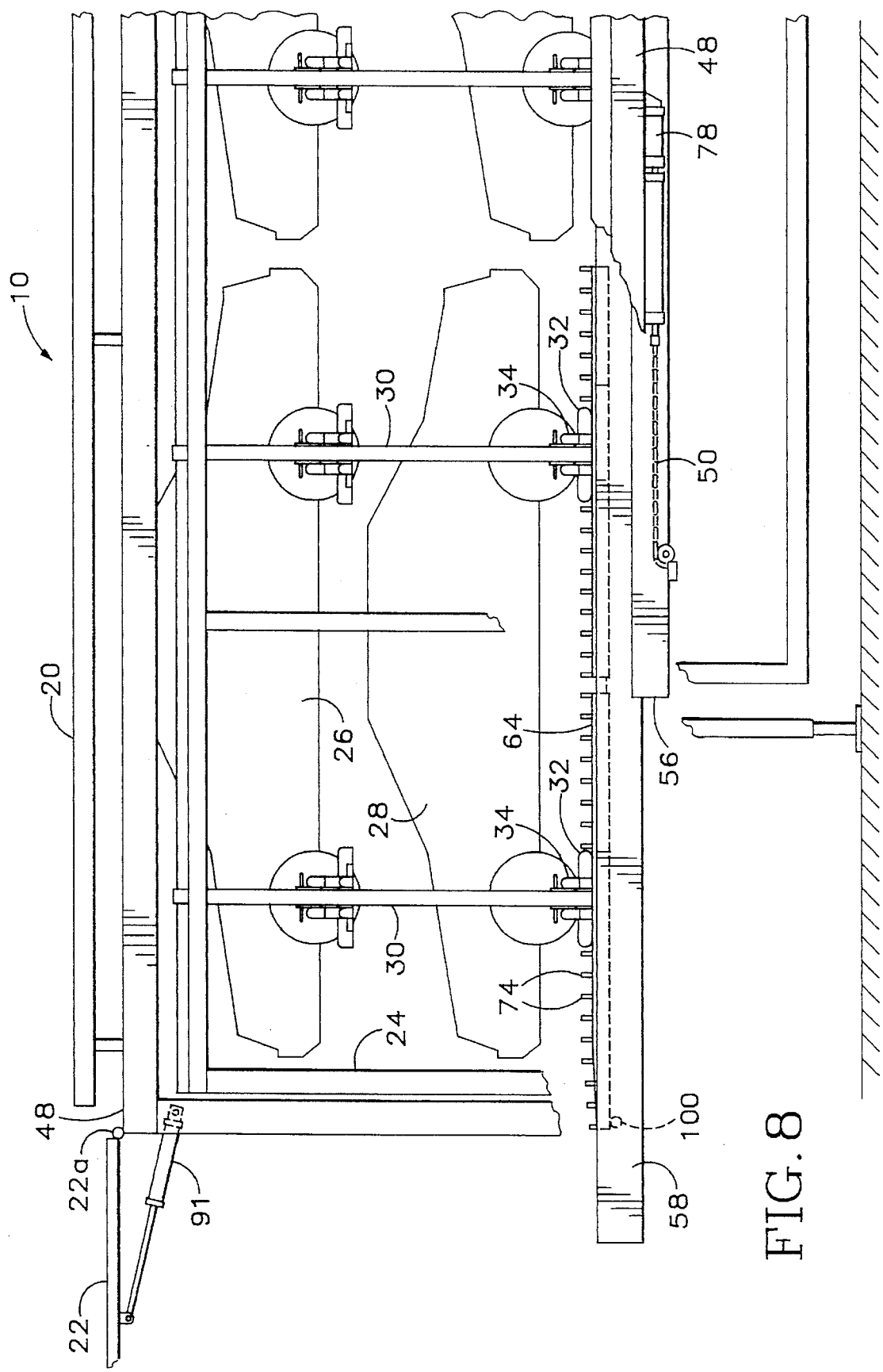
FIG. 8 is a simplified enlarged side view of the forward portion of the transporting vehicle of FIG. 1 with structure removed showing a step of the motor vehicle unloading procedure.

In the first step of the unloading process as shown in FIG. 8, the front door 22 is opened by extending hydraulic cylinders such as 91 to pivot the door 22 upwardly about its hinges 22a, the sled 64 is retracted relative to the secondary guides 58 by the chains 66 in response to the actuation of the motor 68, and the secondary guides 58 are extended forwardly by the chains 60 in response to the actuation of the motor 62. Thereafter, hydraulic cylinders 78 and 80 are retracted while cylinders 54 are extended, raising the primary guides 56 and thereby also the secondary guides 58 and sled 64 upwardly to the positions shown in FIG. 8. As the sled 64 is raised, the chocks 76 of the wheel cradles 32 enter the interstitial spaces between the vertical plates 74 of the sled and the sled raises the wheel cradles 32 off of the shelves 38 of the cradle hangers 34, thereby raising the motor vehicle 28 and transferring it supportably to the sled 64. If the clearance between the upper motor vehicle 26 and the lower motor vehicle 28 is insufficient to permit such raising, the upper motor vehicle 26 can first be raised by the trailer's gantry assembly to be described hereafter.

Figure 9:
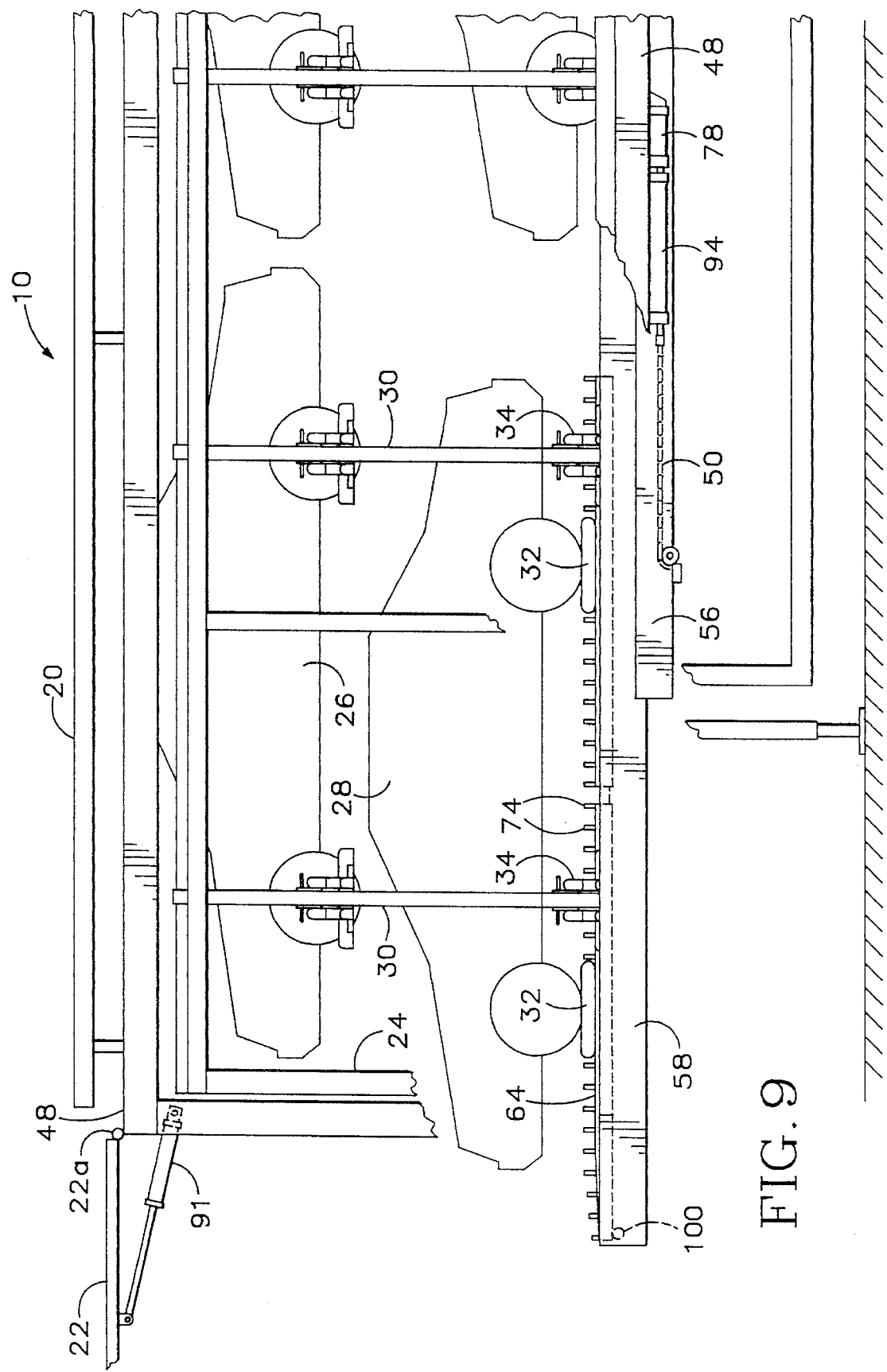
FIG. 9 is a further simplified enlarged side view of the forward portion of the transporting vehicle of FIG. 1 with structure removed showing a further step in the motor vehicle unloading procedure.

The next step in the unloading procedure, depicted in FIG. 9, comprises moving the raised sled 64 forwardly by means of the chains 66 in response to the actuation of the motor 68. This offsets the wheel cradles 32 forwardly of the cradle hangers 34.

Figure 10A:
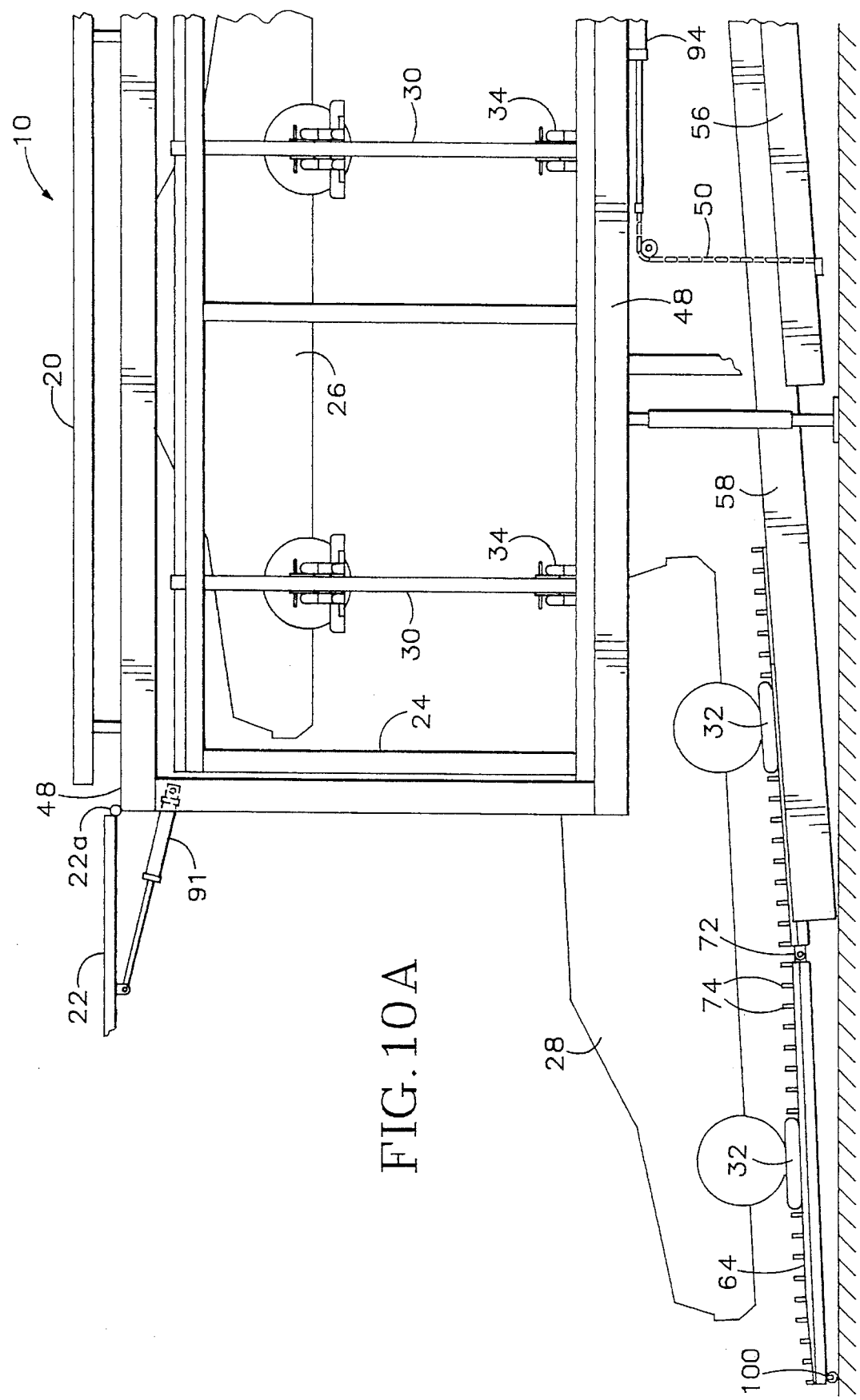
FIGS. 10A and 10B are further simplified enlarged side views of the transporting vehicle of FIG. 1 with structure removed showing a further step in the motor vehicle unloading procedure.
Figure 10B:
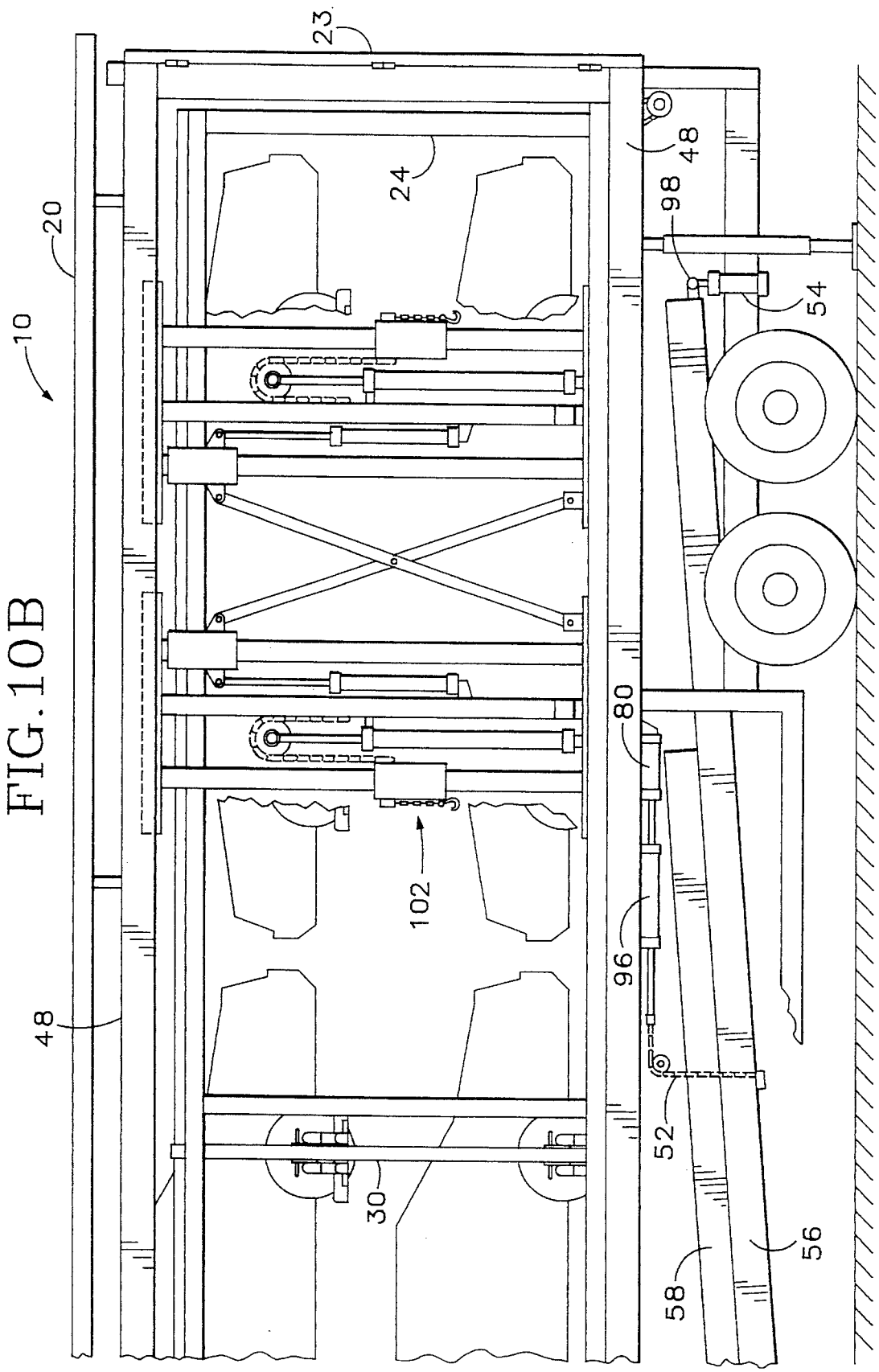

Thereafter, cylinders 78 and 80 are extended while cylinders 54 are retracted to lower the primary guides 56, secondary guides 58, sled 64 and motor vehicle 28. Then hydraulic cylinders 94 and 96 are extended so that the guides 56 and 58 and sled 64 tilt downwardly about a rear pivot axis 98 atop cylinders 54 as shown in FIGS. 10A and 10B. The sled 64 is then extended forwardly from the secondary guides 58 by the chains 66 in response to the actuation of the motor 68 so that the sled's front rollers 100 contact the ground and roll forward to eject the vehicle 28 from the trailer 10. Once the vehicle is in its ejected position shown in FIG. 10A, its doors can be opened safely without striking obstacles, and the driver may enter the vehicle and drive it forwardly off of the wheel cradles 32 and sled 64. The wheel cradles 32 are then removed from the sled 64, the sled is retracted rearwardly, and the cylinders 94 and 96 are also retracted to return the primary guides 56, secondary guides 58 and sled 64 to the positions shown in FIG. 11 preparatory to the unloading of the upper vehicle 26.

Figure 5:
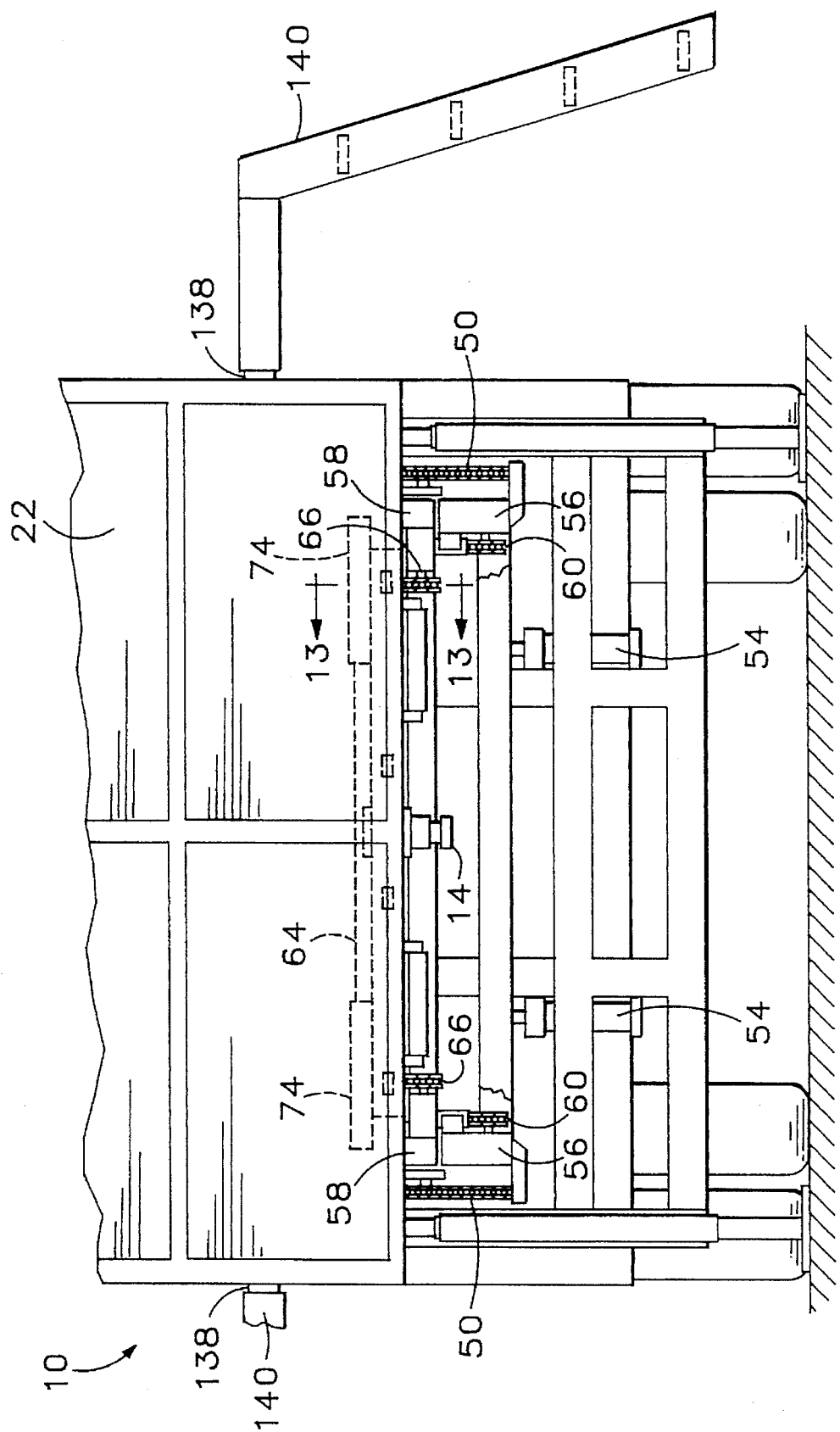
FIG. 5 is a partial simplified front view of the transporting vehicle of FIG. 1.
Figure 11:
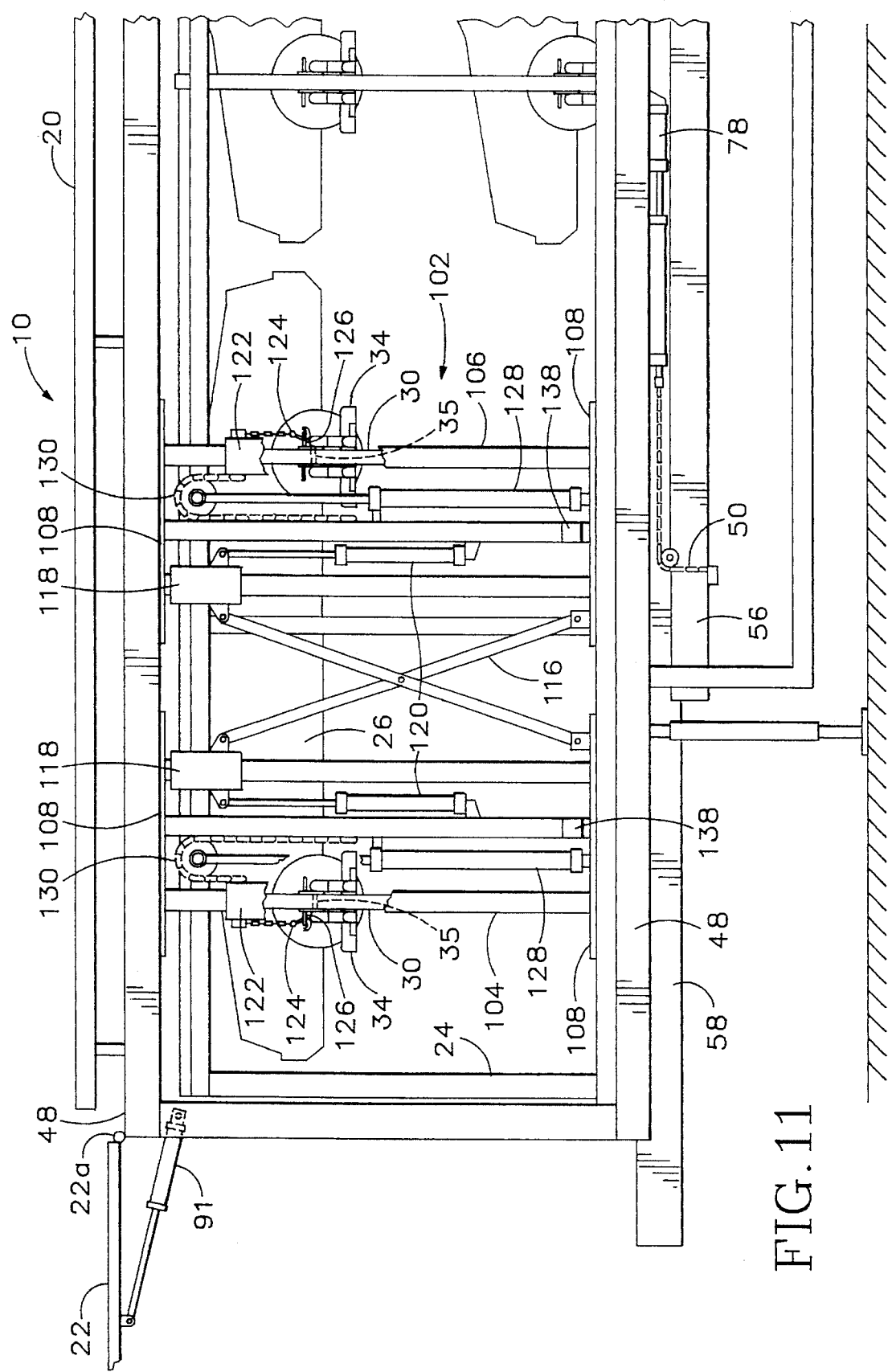
FIG. 11 is a further simplified enlarged side view of the forward portion of the transporting vehicle of FIG. 1 with structure removed showing a further step in the motor vehicle unloading procedure.

For unloading the upper vehicle 26, the trailer 10 is equipped with a gantry assembly indicated generally as 102 in FIG. 11 and comprising a pair of mast assemblies 104, 106 on each side of the trailer. The mast assemblies 104 and 106 are each mounted on upper and lower slides 108 which, as best shown in FIG. 14, are mounted for longitudinal slidable movement between slide bushings 110 carried by the trailer frame 48. The forward mast assembly 104 on each side of the trailer is connected to a respective drive chain 112 powered by a motor 114 (FIG. 4B) which, when actuated, slides the mast assemblies 104 and 106 longitudinally along the frame 48 in unison. The mast assemblies 104 and 106 are joined by a pivotally interconnected scissors linkage 116 whose upper ends are connected to vertically-sliding sleeves 118, which in turn are connected to hydraulic cylinders 120 carried by the respective mast assemblies. Retraction of the cylinders 120 causes the linkage 116 to spread the mast sections 104 and 106 further apart, while extension of the same cylinders causes the linkage to pull the mast sections 104 and 106 closer together. This longitudinal adjustability of the spacing between the mast assemblies 104 and 106 enables each mast assembly to be aligned with a respective longitudinally adjustable member 30 of the frame 24 to match the longitudinal wheel base dimension of the vehicle 26. Each of the mast assemblies 104 and 106 is equipped with a vertically slidable cradle hanger hoist 122 having a chain and hook assembly 124 for selectively attaching to a respective ring 126 at the top of each cradle hanger 34. Each hoist 122 is raised and lowered by means of a respective hydraulic cylinder 128 through a respective chain 130 which lifts each hoist 122 at twice the speed of extension of the cylinder 128 to provide a full range of vertical movement of the hoist 122 between the top and bottom of the frame 24 while enabling each cylinder 128 to operate within the limited vertical space provided. As shown in FIGS. 14 and 15, hydraulic fluid is provided to the various cylinders on the mast assemblies through hydraulic lines 132 and 134 which are interconnected through hydraulic lines carried within a conventional flexible link guide 136, which protects the lines as they move longitudinally in unison with the mast assemblies. As shown in FIG. 5, each of the mast assemblies preferably has a transversely-protruding support 138 to which a scaffold 140 can be removably mounted to enable an operator to position and control the mast assemblies from an elevated position.

Whenever it is necessary to manipulate an upper motor vehicle such as 26, whether to lift it to create sufficient space to lift another vehicle such as 28 located below it, or to transfer it from the frame 24 to the sled 64 of the trailer, the gantry assembly 102 is positioned relative to the upper vehicle as shown in FIG. 11. In this position the hoists 122 are aligned vertically with the respective cradle hangers 34, and the cylinders 128 are extended to lift the hoists 122 above the cradle hangers so that the chain and hook assemblies 124 can be attached to the respective rings 126 of the cradle hangers 34. The hoists 122 are then raised to lift the cradle hangers 34 off of the pins 35 which lock them to the respective members 30 of the frame 24, and the pins 35 are pulled. The previous raising of the trailer top 20 creates additional space to enable the vehicle 26 to be raised without striking the top 20. After the pins 35 are pulled, the cylinders 128 are retracted to lower the hoists 122 and wheel cradles 34. At the same time cylinders 78 and 80 are retracted and cylinders 54 are extended to raise the sled 64 into its elevated position beneath the vehicle 26 to receive the wheel cradles 32, lifting their chocks 76 out of the shelves 38 of the cradle hangers 34 as the shelves 38 are lowered beneath the supporting surface of the sled 64. At this point the vehicle 26 is transferred supportably to the sled 64, as was the vehicle 28 in FIG. 8 described above, and the vehicle 26 is thereafter unloaded from the trailer with the same series of steps as were employed with vehicle 28.

The unloading sequence described with respect to vehicles 28 and 26 is then repeated with respect to the next rearward pair of upper and lower vehicles, and so forth until all of the vehicles have been unloaded from the trailer 10.

Thereafter the primary and secondary guides 56 and 58, respectively, and sled 64 are returned to their traveling positions shown in FIG. 7A, the front door 22 is closed by retraction of cylinders 91 to support the front of the sled by the insertion of the pins 82 into the sockets 84 of the sled, the hitch pin 14 is reattached to the bottom of the sled, and the trailer is ready for reattachment of the tractor 12. After lowering of the top 20 to its closed position and replacement of the removable side-curtains 18, the trailer may be returned to its original loading location where the empty frame 24 can be extracted from the trailer and replaced with a fully-loaded frame 24 for the next delivery.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A system for loading motor vehicles onto, and unloading said vehicles from, a transporter, said system comprising:

(a) an elongate transporter comprising an elongate enclosure having a longitudinal axis;

(b) a vehicle-supporting elongate frame capable of supporting a plurality of motor vehicles in respective upper and lower positions vertically spaced one above the other, said frame being movably insertable into said elongate enclosure with said plurality of motor vehicles supported on said frame in said upper and lower positions, said elongate enclosure being at least as long as said elongate frame so as to enclose said frame; and (c) unloading means mounted on said transporter, arranged so that said frame moves alongside said unloading means when said frame is inserted within said elongate enclosure, for unloading said motor vehicles from said transporter by transferring said motor vehicles from their respective upper and lower positions on said frame while said upper and lower positions remain substantially within said enclosure to positions supported independently of said frame upon a portion of said transporter and by moving said motor vehicles along said longitudinal axis by movement of said portion of said transporter without positioning any person within said motor vehicles.

2. The system of claim 1 wherein said portion of said transporter is arranged so that said frame automatically moves alongside and above said portion when said frame is inserted within said elongate enclosure and said unloading means is capable of selectively lowering said portion with respect to said frame.

3. The system of claim 2 wherein said portion of said transporter is lowered by said unloading means by being tilted longitudinally downwardly in a forward direction relative to said transporter.

4. The system of claim 1 wherein said unloading means includes means for lowering at least one of said motor vehicles with respect to said frame toward said portion of said transporter without positioning any person within said one of said motor vehicles.

5. The system of claim 4 wherein said means for lowering includes means supported independently of said frame for lowering said one of said motor vehicles.

6. The system of claim 1 wherein said enclosure includes a selectively raisable top.

7. The system of claim 1 wherein said enclosure includes selectively openable longitudinally-extending upright sides.

8. A system for loading motor vehicles onto, and unloading said vehicles from, a transporter, said system comprising:

(a) an elongate transporter comprising an elongate enclosure having a longitudinal axis;

(b) a vehicle-supporting elongate frame capable of supporting a plurality of motor vehicles in respective upper and lower positions vertically spaced one above the other, said frame being movably insertable into said elongate enclosure with said plurality of motor vehicles supported on said frame in said upper and lower positions, said elongate enclosure being at least as long as said elongate frame so as to enclose said frame; and (c) unloading means mounted on said transporter, arranged so that said frame moves alongside said unloading means when said frame is inserted within said elongate enclosure, for unloading said motor vehicles from said transporter, said unloading means including means for lowering at least one of said motor vehicles with respect to said frame from one of said upper and lower positions while said upper and lower positions remain substantially within said elongate enclosure and moving said one of said motor vehicles along said longitudinal axis without positioning any person within said one of said motor vehicles.

9. The system of claim 8 wherein said means for lowering includes means supported independently of said frame for lowering said one of said motor vehicles.

10. The system of claim 8 wherein said means for lowering includes a selectively lowerable portion of said transporter arranged so that said frame automatically moves alongside and above said lowerable portion when said frame is inserted within said elongate enclosure and capable of supporting said one of said motor vehicles independently of said frame.

11. The system of claim 10 wherein said unloading means is capable of lowering said portion by tilting said portion downwardly in a forward direction relative to said transporter.

12. The system of claim 8 wherein said enclosure includes a selectively raisable top.

13. The system of claim 8 wherein said enclosure includes selectively openable longitudinally-extending upright sides.

14. A system for loading motor vehicles onto, and unloading said vehicles from, a transporter, said system comprising:

(a) an elongate transporter including an elongate frame-supporting portion having a longitudinal axis;

(b) a vehicle-supporting elongate frame capable of supporting a plurality of motor vehicles in respective upper and lower positions vertically spaced one above the other, said frame being movable onto said frame-supporting portion of said elongate transporter with said plurality of motor vehicles supported on said frame in said upper and lower positions;

(c) an elongate vehicle-supporting portion of said transporter arranged so that said frame moves alongside and above said elongate vehicle-supporting portion when said frame is moved onto said frame-supporting portion, said vehicle-supporting portion being selectively lowerable by means of an unloading device with respect to said frame when said frame is positioned with said upper and lower positions situated above said frame-supporting portion so as to lower said motor vehicles at least partially below said frame-supporting portion while supporting said motor vehicles independently of said frame, said vehicle-supporting portion of said transporter extending longitudinally along said transporter and being mounted by said transporter so as to be selectively movable, while supporting said motor vehicles at least partially below said frame-supporting portion, along said longitudinal axis of said frame-supporting portion of said transporter.

15. The system of claim 14 wherein said vehicle-supporting portion of said transporter is lowerable by means of said unloading device by tilting longitudinally downwardly in a forward direction relative to said transporter.

16. The system of claim 14, further including a vehicle-engaging hoist mounted on said transporter.

17. The system of claim 16 wherein said hoist is supported independently of said frame upon said transporter.

18. The system of claim 14 wherein said transporter includes an elongate enclosure at least as long as said elongate frame for enclosing said frame.

19. The system of claim 18 wherein said enclosure includes a selectively raisable top.

20. The system of claim 18 wherein said enclosure includes selectively openable longitudinally-extending upright sides.

* * * * *